US012634056B2

(12) United States Patent
Dai et al.

(10) Patent No.: US 12,634,056 B2
(45) Date of Patent: May 19, 2026

(54) CODE BLOCK OPERATION FOR PHYSICAL UPLINK SHARED CHANNEL REPETITIONS WITH TRANSPORT BLOCK SCALING AND FREQUENCY HOPPING

(71) Applicant: QUALCOMM Incorporated, San Diego, CA (US)

(72) Inventors: Jing Dai, Beijing (CN); Chao Wei, Beijing (CN); Chenxi Hao, Beijing (CN); Qiaoyu Li, Beijing (CN); Hao Xu, Beijing (CN); Wei Xi, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 18/007,419

(22) PCT Filed: Sep. 29, 2020

(86) PCT No.: PCT/CN2020/118739
§ 371 (c)(1),
(2) Date: Jan. 30, 2023

(87) PCT Pub. No.: WO2022/067478
PCT Pub. Date: Apr. 7, 2022

(65) Prior Publication Data
US 2024/0259147 A1      Aug. 1, 2024

(51) Int. Cl.
*H04L 5/00* (2006.01)
*H04B 1/713* (2011.01)
(52) U.S. Cl.
CPC ........... *H04L 5/0016* (2013.01); *H04B 1/713* (2013.01)

(58) Field of Classification Search
CPC .............................. H04L 5/0016; H04B 1/713
See application file for complete search history.

(56) References Cited

U.S. PATENT DOCUMENTS

| | | | |
|---|---|---|---|
| 2019/0075589 A1 | 3/2019 | Jeon et al. | |
| 2020/0162208 A1 | 5/2020 | Moon et al. | |
| (Continued) | | | |

FOREIGN PATENT DOCUMENTS

| | | |
|---|---|---|
| CN | 105850058 A | 8/2016 |
| CN | 107197521 A | 9/2017 |
| (Continued) | | |

OTHER PUBLICATIONS

International Search Report and Written Opinion—PCT/CN2020/118739—ISA/EPO—Jun. 29, 2021.
(Continued)

*Primary Examiner* — Kevin T Bates
*Assistant Examiner* — Jaeyoung Kwak
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may determine a transport block size based at least in part on a set of physical uplink shared channel resources corresponding to a set of physical uplink shared channel repetitions that are indicated to be transmitted over at least one repetition unit in accordance with a frequency hopping pattern and at least one code block mapping order corresponding to the at least one repetition unit. The UE may transmit the set of physical uplink shared channel repetitions based at least in part on the transport block size. Numerous other aspects are provided.

30 Claims, 11 Drawing Sheets

500 ⟶

(56)                    References Cited

U.S. PATENT DOCUMENTS

| | | | |
|---|---|---|---|
| 2020/0186284 A1* | 6/2020 | Noh | H04L 1/00 |
| 2020/0221478 A1 | 7/2020 | Fakoorian et al. | |
| 2020/0280338 A1* | 9/2020 | Matsumura | H04B 1/713 |
| 2021/0274527 A1* | 9/2021 | Nakamura | H04L 5/0044 |
| 2022/0132495 A1 | 4/2022 | Bae et al. | |
| 2022/0140859 A1* | 5/2022 | Takeda | H04B 1/713 |
| | | | 375/135 |
| 2022/0271880 A1* | 8/2022 | Choi | H04B 1/7143 |
| 2022/0393717 A1* | 12/2022 | Li | H04L 1/08 |
| 2023/0068475 A1* | 3/2023 | Yang | H04L 5/0044 |

FOREIGN PATENT DOCUMENTS

| | | | |
|---|---|---|---|
| WO | 2018228487 A1 | 12/2018 | |
| WO | 2020145772 A1 | 7/2020 | |

OTHER PUBLICATIONS

European Search Report—EP20955506—Search Authority—The Hague—Mar. 12, 2024.

\* cited by examiner

500

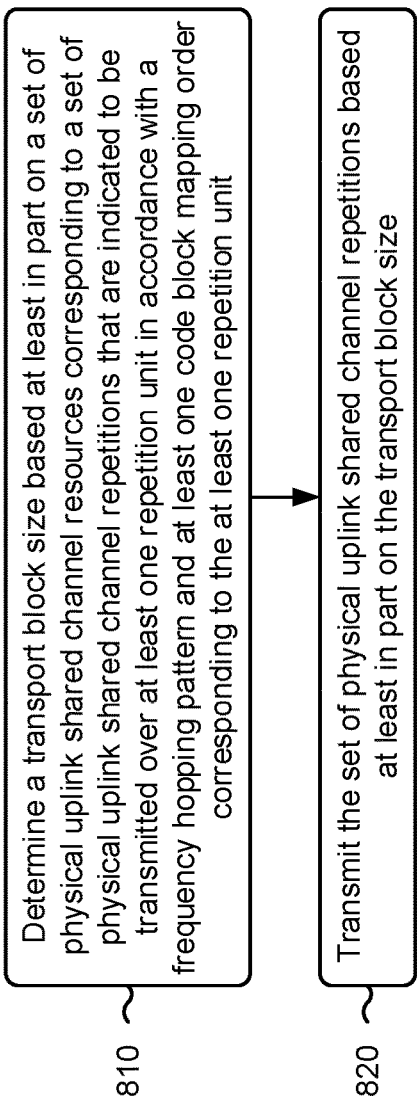

Determine a transport block size based at least in part on a set of physical uplink shared channel resources corresponding to a set of physical uplink shared channel repetitions that are indicated to be transmitted over at least one repetition unit in accordance with a frequency hopping pattern and at least one code block mapping order corresponding to the at least one repetition unit

810

Transmit the set of physical uplink shared channel repetitions based at least in part on the transport block size

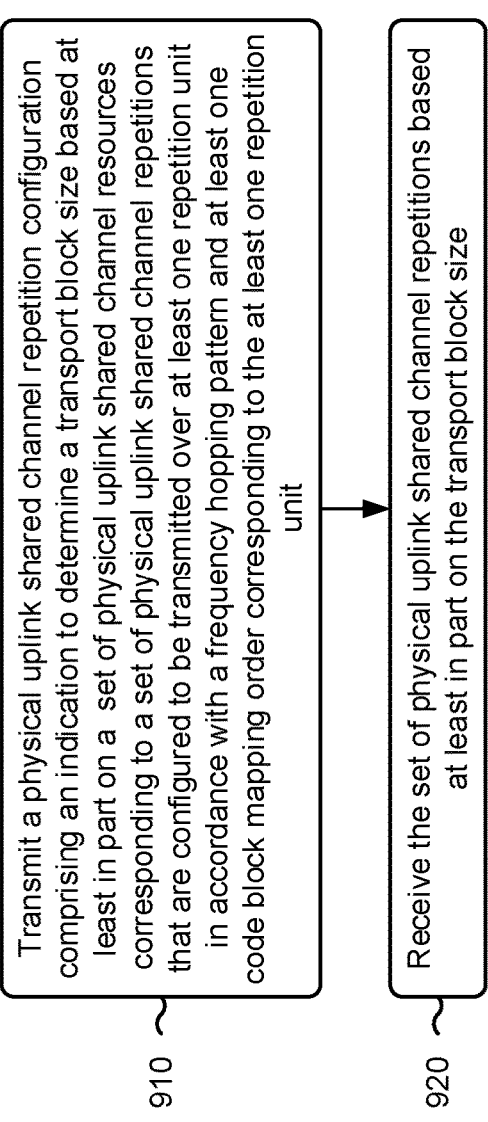

Transmit a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit in accordance with a frequency hopping pattern and at least one code block mapping order corresponding to the at least one repetition unit

910

Receive the set of physical uplink shared channel repetitions based at least in part on the transport block size

CODE BLOCK OPERATION FOR PHYSICAL UPLINK SHARED CHANNEL REPETITIONS WITH TRANSPORT BLOCK SCALING AND FREQUENCY HOPPING

CROSS-REFERENCE TO RELATED APPLICATION

This Patent Application is a 371 national stage of PCT Application No. PCT/CN2020/118739 filed on Sep. 29, 2020, entitled "CODE BLOCK OPERATION FOR PHYSICAL UPLINK SHARED CHANNEL REPETITIONS WITH TRANSPORT BLOCK SCALING AND FREQUENCY HOPPING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for code block operation for physical uplink shared channel repetitions with transport block scaling and frequency hopping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors coupled to the memory, the memory and the one or more processors configured to: determine a transport block size based at least in part on a set of physical uplink shared channel resources corresponding to a set of physical uplink shared channel (PUSCH) repetitions that are indicated to be transmitted over at least one repetition unit in accordance with a frequency hopping pattern and at least one code block mapping order corresponding to the at least one repetition unit; and transmit the set of PUSCH repetitions based at least in part on the transport block size.

In some aspects, a base station for wireless communication includes a memory; and one or more processors coupled to the memory, the memory and the one or more processors configured to: transmit a PUSCH repetition configuration comprising an indication to determine a transport block size based at least in part on a set of PUSCH resources corresponding to a set of PUSCH repetitions that are configured to be transmitted over at least one repetition unit in accordance with a frequency hopping pattern and at least one code block mapping order corresponding to the at least one repetition unit; and receive the set of PUSCH repetitions based at least in part on the transport block size.

In some aspects, a method of wireless communication performed by a UE includes determining a transport block size based at least in part on a set of PUSCH resources corresponding to a set of PUSCH repetitions that are indicated to be transmitted over at least one repetition unit in accordance with a frequency hopping pattern and at least one code block mapping order corresponding to the at least one repetition unit; and transmitting the set of PUSCH repetitions based at least in part on the transport block size.

In some aspects, a method of wireless communication performed by a base station includes transmitting a PUSCH repetition configuration comprising an indication to determine a transport block size based at least in part on a set of PUSCH resources corresponding to a set of PUSCH repetitions that are configured to be transmitted over at least one repetition unit in accordance with a frequency hopping pattern and at least one code block mapping order corresponding to the at least one repetition unit; and receiving the set of PUSCH repetitions based at least in part on the transport block size.

In some aspects, a non-transitory computer-readable medium storing a set of instructions for wireless communication includes one or more instructions that, when executed by one or more processors of a UE, cause the UE to: determine a transport block size based at least in part on a set of PUSCH resources corresponding to a set of PUSCH repetitions that are indicated to be transmitted over at least one repetition unit in accordance with a frequency hopping pattern and at least one code block mapping order corresponding to the at least one repetition unit; and transmit the set of PUSCH repetitions based at least in part on the transport block size.

In some aspects, a non-transitory computer-readable medium storing a set of instructions for wireless communication includes one or more instructions that, when executed by one or more processors of a base station, cause the base station to: transmit a PUSCH repetition configuration comprising an indication to determine a transport block size based at least in part on a set of PUSCH resources corresponding to a set of physical uplink shared channel repetitions that are configured to be transmitted over at least one repetition unit in accordance with a frequency hopping pattern and at least one code block mapping order corresponding to the at least one repetition unit; and receive the set of PUSCH repetitions based at least in part on the transport block size.

In some aspects, an apparatus for wireless communication includes means for determining a transport block size based at least in part on a set of PUSCH resources corresponding to a set of PUSCH repetitions that are indicated to be transmitted over at least one repetition unit in accordance with a frequency hopping pattern and at least one code block mapping order corresponding to the at least one repetition unit; and means for transmitting the set of PUSCH repetitions based at least in part on the transport block size.

In some aspects, an apparatus for wireless communication includes means for transmitting a physical uplink shared channel repetition configuration comprising an indication to determine a transport block size based at least in part on a set of PUSCH resources corresponding to a set of PUSCH repetitions that are configured to be transmitted over at least one repetition unit in accordance with a frequency hopping pattern and at least one code block mapping order corresponding to the at least one repetition unit; and means for receiving the set of PUSCH repetitions based at least in part on the transport block size.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with code block operation for PUSCH repetition with transport block scaling and frequency hopping, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
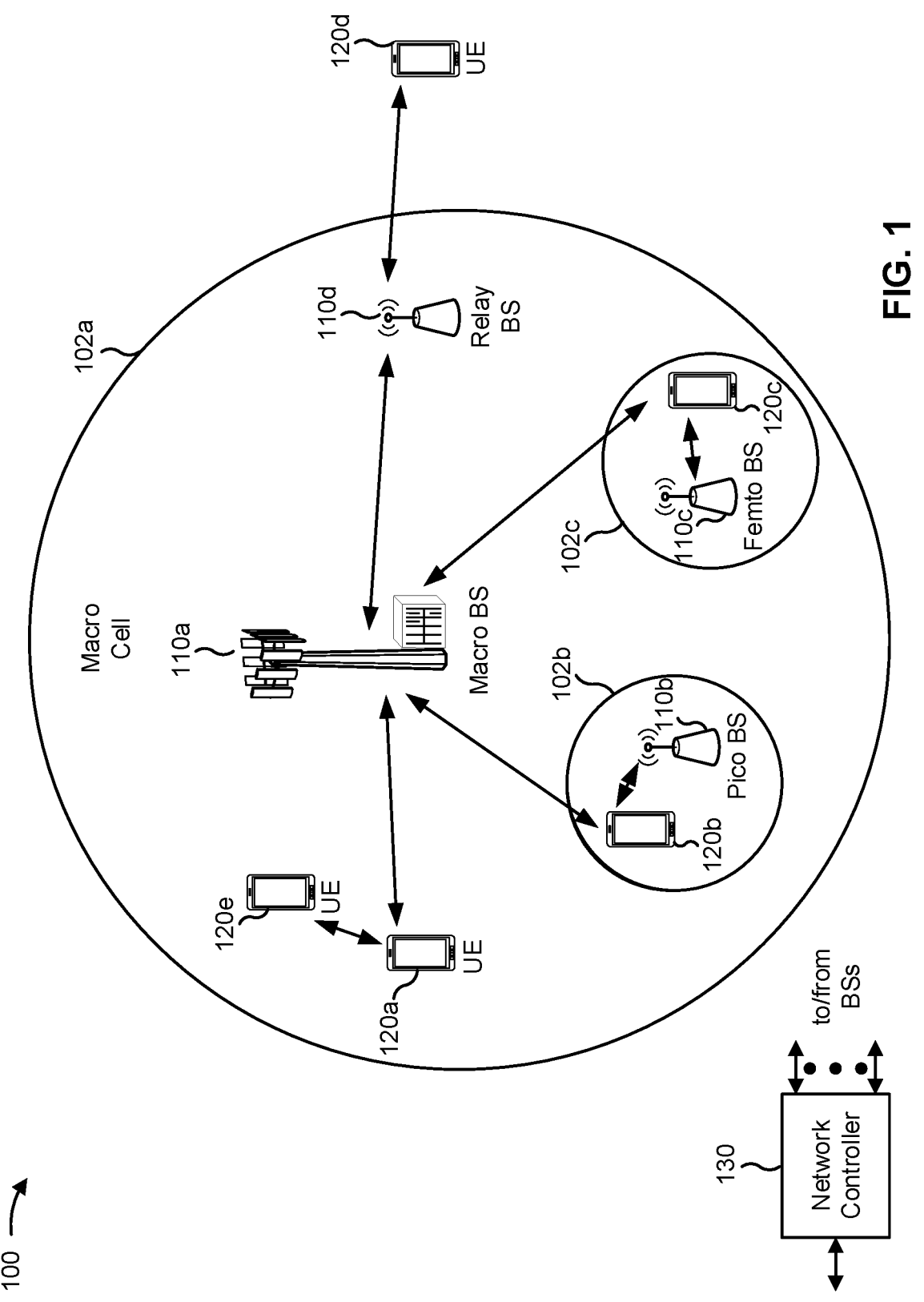
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE

120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz—300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
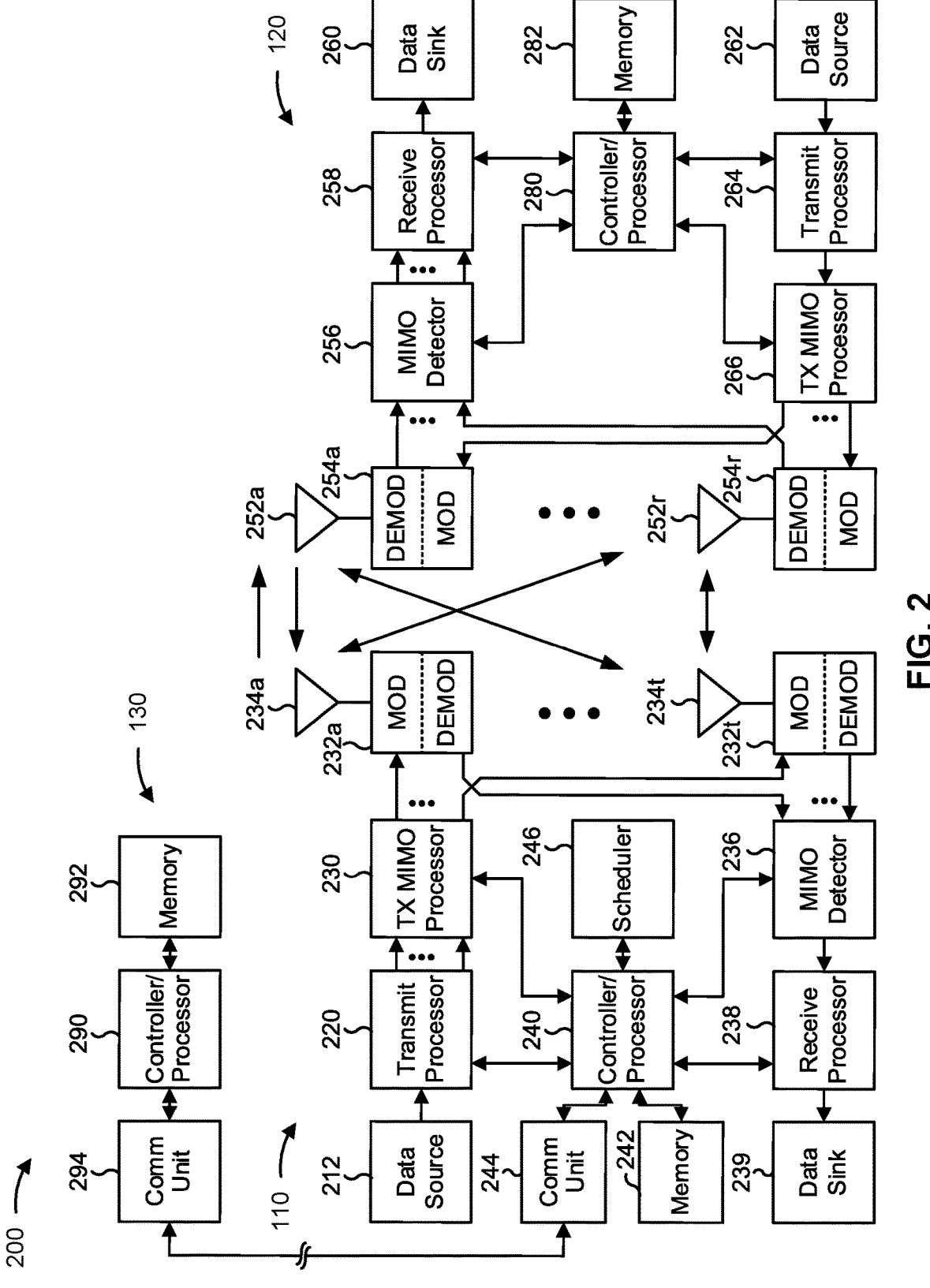
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream.

Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/ processor 280 of UE 120, and/or any other component(s) of FIG. 2 may perform one or more techniques associated with code block operation for physical uplink shared channel (PUSCH) repetition with transport block scaling and fre- quency hopping, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer- readable medium storing one or more instructions (e.g., code, program code, and/or the like) for wireless commu- nication. For example, the one or more instructions, when executed (e.g., directly, or after compiling, converting, inter- preting, and/or the like) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instruc- tions, compiling the instructions, interpreting the instruc- tions, and/or the like.

In some aspects, UE 120 may include means for deter- mining a transport block size based at least in part on a set of physical uplink shared channel resources corresponding to a set of physical uplink shared channel repetitions that are indicated to be transmitted over at least one repetition unit in accordance with a frequency hopping pattern and at least one code block mapping order corresponding to the at least one repetition unit, means for transmitting the set of physical uplink shared channel repetitions based at least in part on the transport block size, and/or the like. In some aspects, such means may include one or more components of UE 120 described in connection with FIG. 2, such as controller/ processor 280, transmit processor 264, TX MIMO processor 266, MOD 254, antenna 252, DEMOD 254, MIMO detector 256, receive processor 258, and/or the like.

In some aspects, base station 110 may include means for transmitting a physical uplink shared channel repetition configuration comprising an indication to determine a trans- port block size based at least in part on a set of physical uplink shared channel resources corresponding to a set of physical uplink shared channel repetitions that are config- ured to be transmitted over at least one repetition unit in accordance with a frequency hopping pattern and at least one code block mapping order corresponding to the at least one repetition unit, the at least one code block mapping order providing frequency hop diversity among a set of code blocks associated with the at least one repetition unit, means for receiving the set of physical uplink shared channel repetitions based at least in part on the transport block size, and/or the like. In some aspects, such means may include one or more components of base station 110 described in connection with FIG. 2, such as antenna 234, DEMOD 232, MIMO detector 236, receive processor 238, controller/ processor 240, transmit processor 220, TX MIMO processor 230, MOD 232, antenna 234, and/or the like.

While blocks in FIG. 2 are illustrated as distinct compo- nents, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
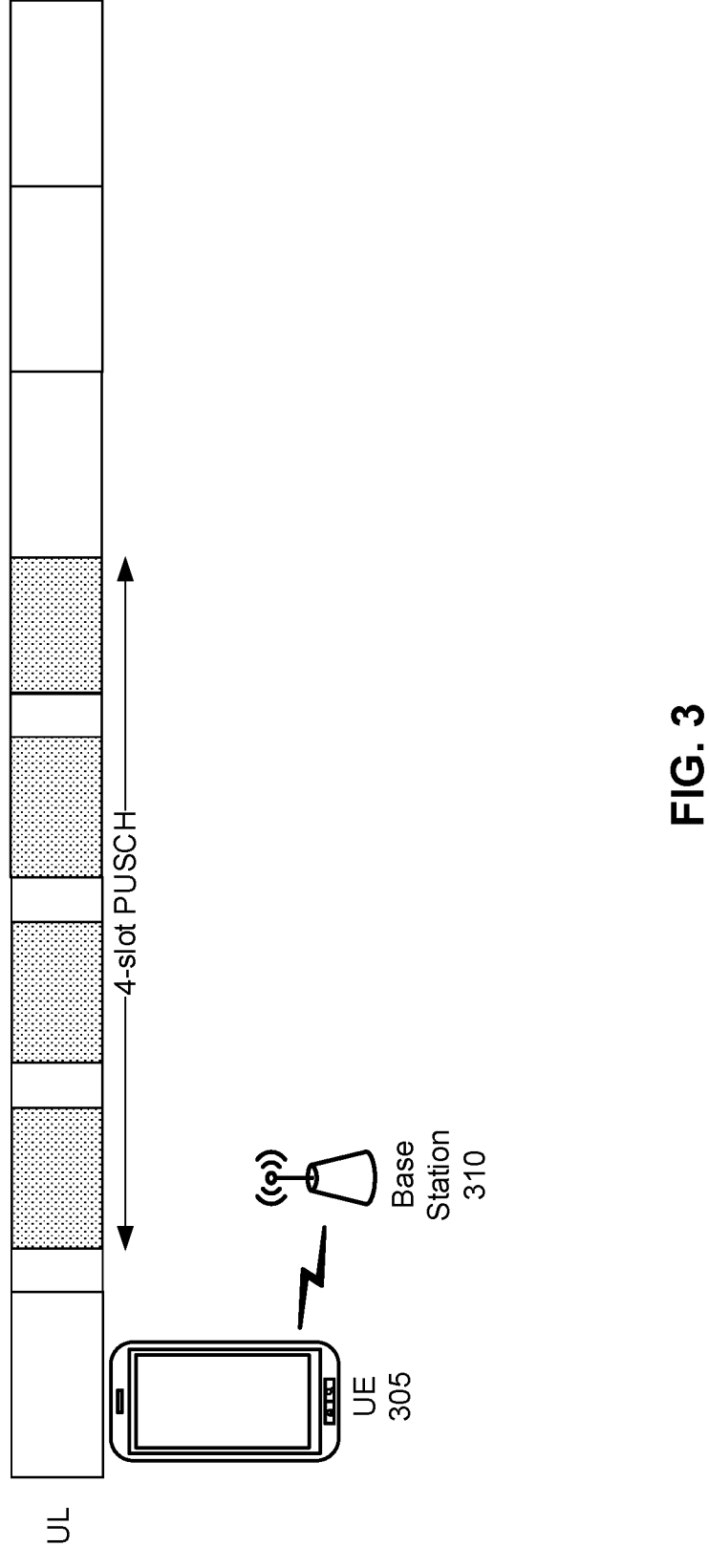
FIG. 3 is a diagram illustrating an example of physical uplink shared channel (PUSCH) repetition, in accordance with various aspects of the present disclosure.

FIG. 3 is a diagram illustrating an example 300 of PUSCH repetition, in accordance with various aspects of the present disclosure. As shown in FIG. 3, a UE 305 and a base station 310 may communicate with one another. The UE 305 and the base station 310 may communicate with one another via a wireless network (e.g., the wireless network 100 shown in FIG. 1).

As shown, the UE 305 may repeat a transmission of a PUSCH communication over a number of slots. For example, as shown, the UE 305 may transmit a number of PUSCH repetitions over successive slots. As used herein, "repetition" refers to a communication that is transmitted more than one time, and refers to the initial transmission of that communication or any subsequent retransmission of that communication. PUSCH repetition (which may be referred to, for example, as slot-repetition, slot-aggregation, and/or multi-slot PUSCH) may be used to increase a signal-to-noise ratio (SNR) to improve transmission reliability.

A modulation and coding scheme (MCS) and/or a resource allocation may be indicated in a scheduling down- link control information (DCI) transmission. The MCS and/or the resource allocation may be common over the successive slots. For each slot of the multi-slot PUSCH, a transmission block may be the same (because the same data is being retransmitted. The encoded bits between PUSCH repetitions may differ.

For example, the redundancy version (RV) of each slot may be different. The RV of the first slot may be indicated in a scheduling DCI, while the RV of the $n^{th}$ slot may be determined by 'n mod 4.' For example, for a first transmis- sion of a 4-slot PUSCH, an RV order may be {RV0,RV2, RV3,RV1}. An RV order or a retransmission of a 4-slot PUSCH may be, for example, {RV3,RV1,RV0,RV2}.

As indicated above, FIG. 3 is provided as an example. Other examples may differ from what is described with regard to FIG. 3.

Figure 4:
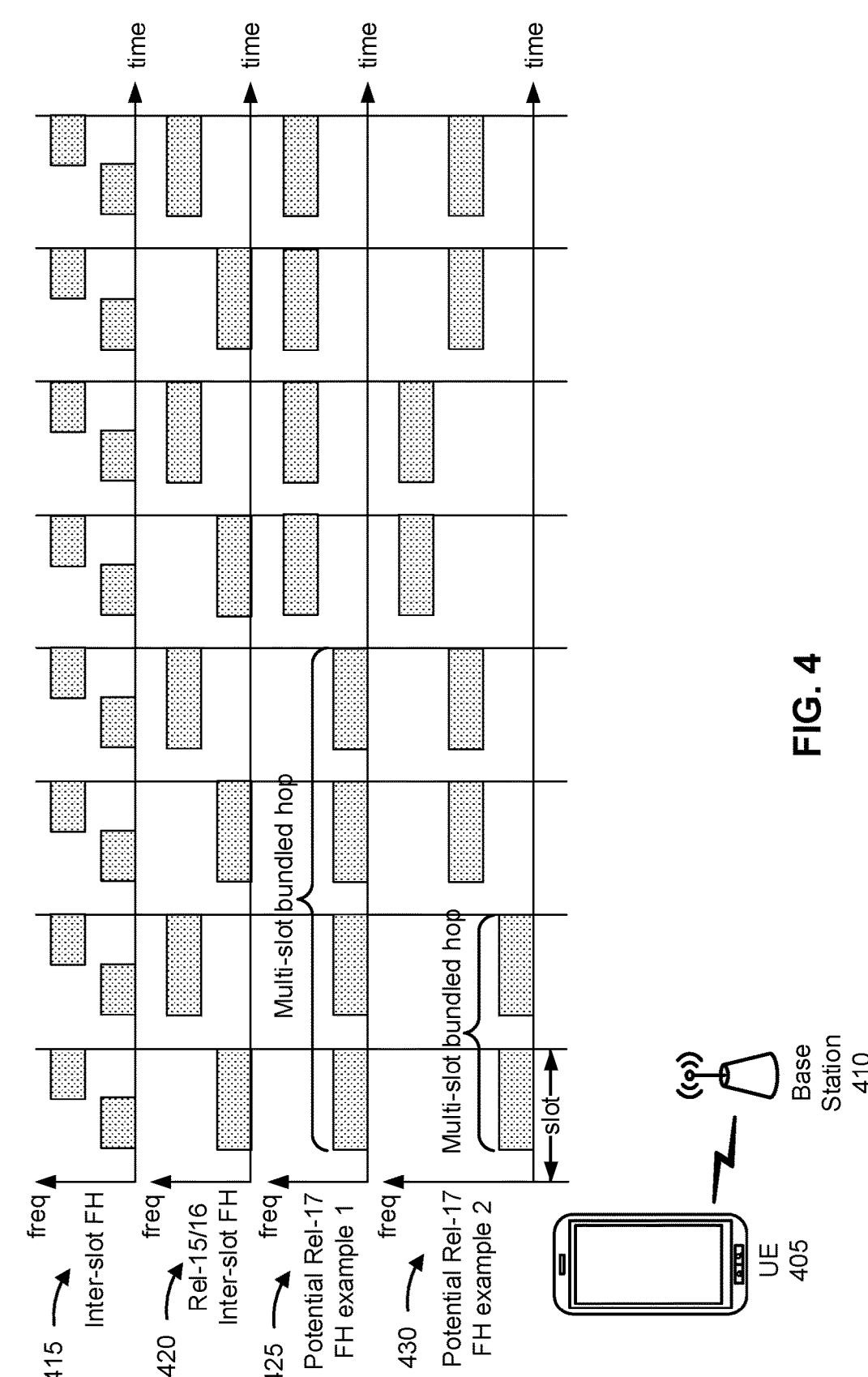
FIGS. 4 and 5 are diagrams illustrating examples of PUSCH repetition with frequency hopping, in accordance with various aspects of the present disclosure.

FIG. 4 is a diagram illustrating an example 400 of PUSCH repetition with frequency hopping, in accordance with vari- ous aspects of the present disclosure. As shown in FIG. 4, a UE 405 and a base station 410 may communicate with one another. The UE 405 and the base station 410 may commu- nicate with one another via a wireless network (e.g., the wireless network 100 shown in FIG. 1). The UE 405 may be, or be similar to, the UE 305 shown in FIG. 3, and the base station 410 may be, or be similar to, the base station 310 shown in FIG. 3.

As shown, the UE 405 may transmit PUSCH communi- cations using an intra-slot frequency hopping scheme 415 in which each frequency hop occurs within a slot, an inter-slot frequency hopping scheme 420 in which each frequency hop corresponds to a single slot, or an inter-slot frequency hopping scheme 425 in which frequency hop corresponds to a multi-slot bundling (e.g., to enable channel estimation over the bundling). As shown, the frequency hopping scheme 415, 420, or 425 may include two frequency locations. In some cases, a frequency hopping scheme 430 may include more than two frequency locations to improve frequency resource diversity. The multi-slot hops may include demodulation reference signal (DMRS) patterns with reduced DMRS symbols. For example, cross-slot channel estimation may facilitate reducing the DMRS symbols.

Transport blocks transmitted in different transmission time intervals (TTIs) (e.g., slots, mini-slots, sets of symbols, and/or the like) may be associated with different parameters used to determine respective transport block sizes of those transport blocks. A parameter used to determine a size of a transport block may be referred to as a transport block size determination parameter, and may include, for example, an MCS used for the transport block, a number of resource elements allocated for the transport block, a number of layers to be used to transmit the transport block, and/or the like. When different transport blocks are transmitted in different TTIs and/or by different base stations 310, those transport blocks may have different transport block sizes if those transport blocks are associated with different transport block size determination parameters.

In a typical case, transport block size may be determined with PUSCH resources of a single slot, even in the case of PUSCH repetition. For example, transport block size may be determined in accordance with the relationship TBS+ $L_{CRC} \approx N_{RE} \cdot R \cdot Q_m$, where R and $Q_m$ are code rate and modulation order indicated by MCS respectively, and $N_{RE}$ is the total number of data resource elements of PUSCH in a single slot. Determining transport block size in this way can result in a very low effective code rate for a multi-slot PUSCH since the effective code rate, $R_{eff,multi-slot}$=R/M, where M is the number of slots.

However, for uplink limited coverage scenarios, where the transmit power of the UE 305 is a bottleneck, further lowering of an already-low effective code rate, $R_{eff}$, can be harmful to the transmission reliability and can increase consumption of resources and/or bandwidth. For example, a double bandwidth associated with half of an effective coding rate ($R_{eff}/2$) lowers the power spectrum density (PSD) by 3 dB for uplink with limited transmission power. Thus, SNR also is decreased by 3 dB. Although the combining gain of $R_{eff}/2$ may generally be 3 dB, the channel estimation loss due to the lower SNR makes this gain less than 3 dB.

As indicated above, FIG. 4 is provided as an example. Other examples may differ from what is described with regard to FIG. 4.

Figure 5:
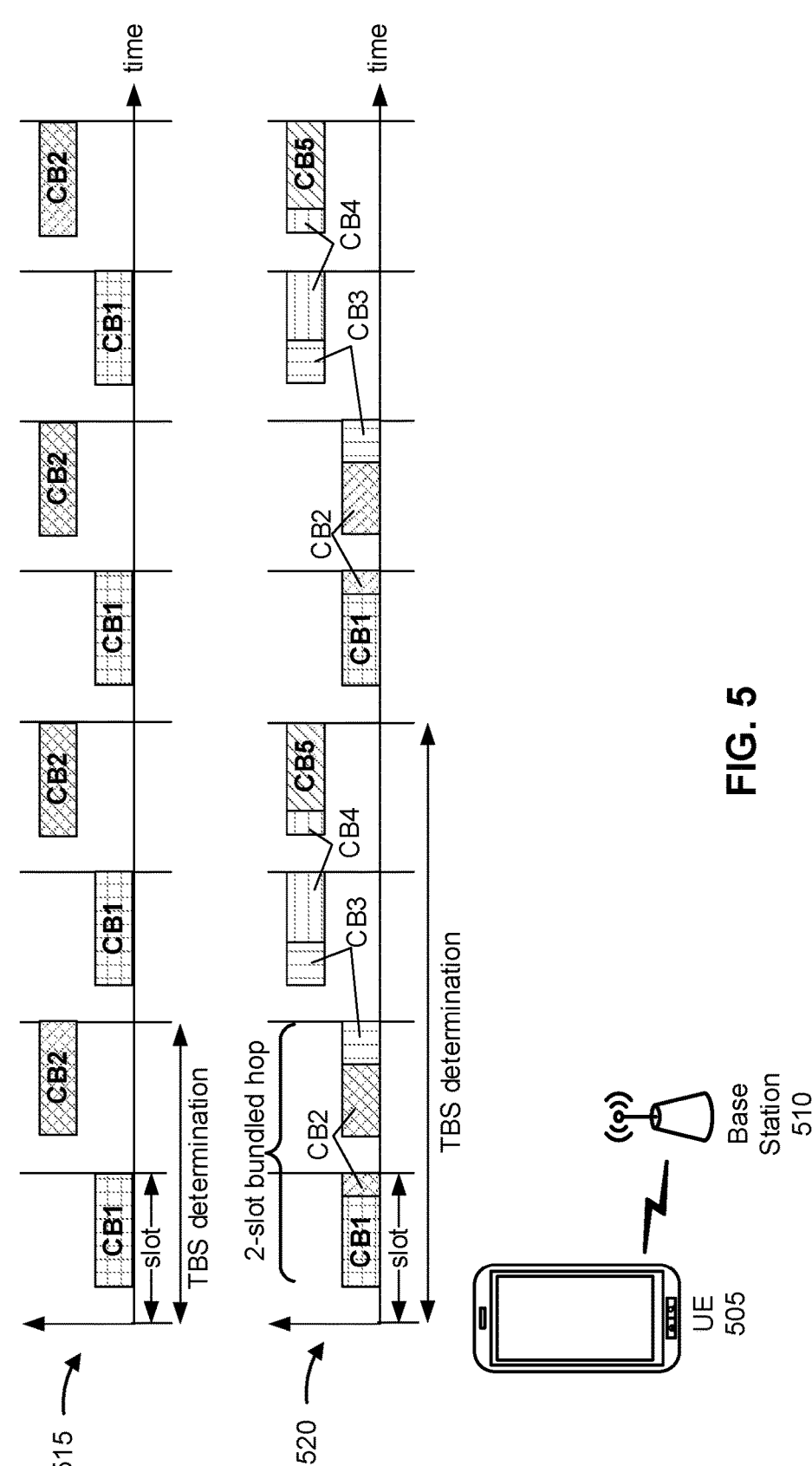

FIG. 5 is a diagram illustrating an example 500 of PUSCH repetition with frequency hopping, in accordance with various aspects of the present disclosure. As shown in FIG. 5, a UE 505 and a base station 510 may communicate with one another. The UE 505 and the base station 510 may communicate with one another via a wireless network. The UE 505 may be, or be similar to, the UE 405 shown in FIG. 4 and/or the UE 305 shown in FIG. 3, and the base station 510 may be, or be similar to, the base station 410 shown in FIG. 4 and/or the base station 310 shown in FIG. 3.

As shown, the UE 505 may transmit PUSCH communications using an inter-slot frequency hopping scheme 515 in which each frequency hop occurs in a slot. As shown, a transport block sized over two successive slots may include two code blocks (shown as "CB1" and "CB2"). In some cases, due to an alternating code block order, CB1 may be transmitted on a first frequency resource and CB2 may be transmitted on a second resource, as shown. Thus, implementing the code blocks in this way may result in no frequency diversity associated with the code blocks, which may negatively impact network performance.

As shown by reference number 520, for transport block scaling with 4 (i.e. sized over 4 successive slots), additional code blocks (shown as "CB3" and "CB4" may be separated in a similar manner, while code blocks are bundled for hops. However, as shown, this implementation also results in no frequency diversity associated with the code blocks (CB1, CB2, CB4 and CB5), which may negatively impact network performance.

According to some aspects of the techniques and apparatuses described herein, transport block size may be determined based at least in part on PUSCH resources over multiple slots with frequency hopping. For example, transport block size may be scaled using an integer factor, M, that corresponds to a repetition slot count. In some aspects, transport block size determination may be based at least in part on PUSCH resources corresponding to a set of PUSCH repetitions that are configured to be transmitted over a repetition unit. The repetition unit may include a plurality of slots in accordance with a frequency hopping pattern. A code block mapping order of each repetition unit for transport block size determination may be different. In this way, some aspects of the techniques and apparatuses facilitate providing frequency diversity associated with the code blocks in transport block scaling scenarios. As a result, some aspects of the techniques and apparatuses may positively impact network performance.

As indicated above, FIG. 5 is provided as an example. Other examples may differ from what is described with regard to FIG. 5.

Figure 6:
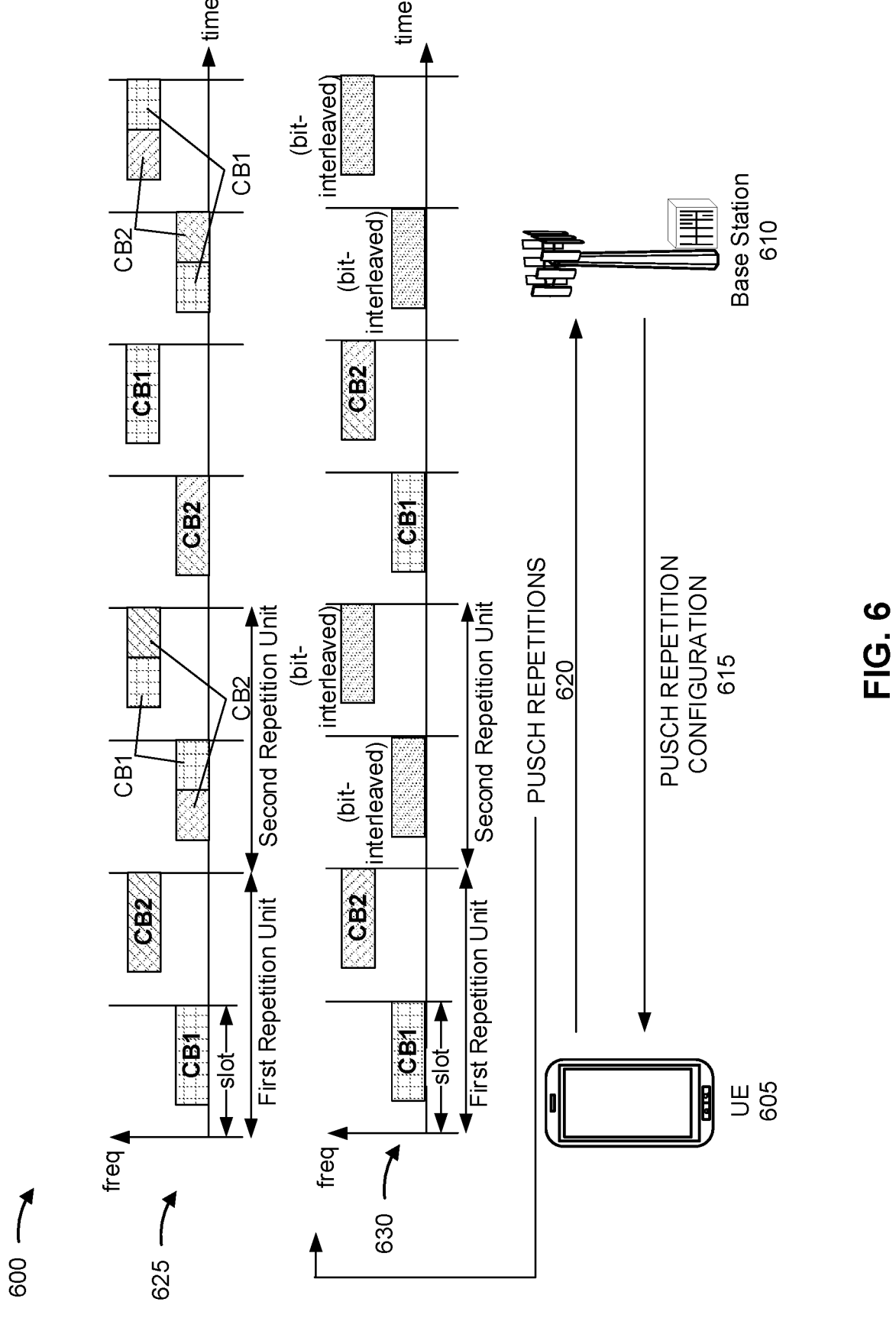
FIGS. 6 and 7 are diagrams illustrating examples associated with code block operation for PUSCH repetition with transport block scaling and frequency hopping, in accordance with various aspects of the present disclosure.

FIG. 6 is a diagram illustrating an example 600 associated with code block operation for PUSCH repetition with transport block scaling and frequency hopping, in accordance with various aspects of the present disclosure. As shown in FIG. 6, a UE 605 and a base station 610 may communicate with one another. The UE 605 and the base station 610 may communicate with one another via a wireless network (e.g., the wireless network 100 shown in FIG. 1). The UE 605 may be, or be similar to, the UE 120 shown in FIG. 1, and the base station 610 may be, or be similar to, the base station 110 shown in FIG. 1.

As shown by reference number 615, the base station 610 may transmit, and the UE 505 may receive, a PUSCH repetition configuration. In some aspects, the PUSCH repetition configuration may be carried in a radio resource control message. The PUSCH repetition configuration may include an indication to determine a transport block size based at least in part on a set of PUSCH resources corresponding to a set of PUSCH repetitions.

As shown by reference number 620, the UE 605 may transmit, and the base station 610 may receive, the set of PUSCH repetitions. The UE 605 may transmit the set of PUSCH repetitions based at least in part on the transport block size, a frequency hopping pattern, and/or the PUSCH repetition configuration. The PUSCH repetitions may be configured to be transmitted over at least one repetition unit in accordance with a frequency hopping pattern. The frequency hopping pattern may include a single-slot hop and/or a bundled multi-slot hop. In some aspects, at least one code block mapping order may correspond to the at least one repetition unit. The at least one code block mapping order may provide frequency hop diversity among a set of code blocks associated with the at least one repetition unit.

As shown by reference number 625, a cyclic shift of encoded bits may be used for different repetition units. For example, the at least one code block mapping order may include a first code block mapping corresponding to a first repetition unit of the at least one repetition unit and a second code block mapping corresponding to a second repetition unit of the at least one repetition unit. The first code block mapping order of the first code block mapping corresponding to the first repetition unit may be different than a second code block mapping order of the second code block mapping corresponding to the second repetition unit. The first code block mapping may include a first cyclic shift of a plurality of encoded bits, and the second code block mapping may include a second cyclic shift of the plurality of encoded bits that is different than the first cyclic shift. In some aspects, as shown by reference number 625, a shift value corresponding to the first cyclic shift may be equal to an encoded bit length of one or more code blocks associated with the first repetition unit.

As shown, for example, a first code block (shown as "CB1") may be transmitted on a first frequency resource in a first repetition unit and a second code block (shown as "CB2") may be transmitted on a second frequency resource in the first repetition unit. In the second repetition unit, the encoded bits of CB2 have been shifted such that a first portion of CB2 is transmitted on the first frequency resource during the second repetition unit and a second portion of CB2 is transmitted on the second frequency resource during the second repetition unit. Similarly, the encoded bits of CB1 are shifted between the first and second repetition unit, as shown.

In some aspects, the first code block mapping may include a first cross-code block interleaving of encoded bits, and the second code block mapping may include a second cross-code block interleaving of the encoded bits. As shown by reference number 630, the first repetition unit may not include inter-leaving, while the second repetition unit includes cross-code block interleaving of encoded bits. In the first slot, CB1 is transmitted using a first frequency resource and, in the second slot, CB2 is transmitted using a second frequency resource. In the third slot, at least a portion of CB1 and at least a portion of CB2 are interleaved together at the bit level and this bit-interleaved PUSCH communication is transmitted using the first frequency resource. In the fourth slot, at least a portion of CB1 and at least a portion of CB2 are interleaved together at the bit level and this bit-interleaved PUSCH communication is transmitted using the second frequency resource.

According to various aspects, techniques such as cyclically shifting bits of code blocks, as shown in connection with reference number 625 and interleaving bits from multiple code blocks may be used to provide frequency diversity of the encoded bits. By transmitting different portions of the repeated PUSCH communications using different frequency resources, the chances of a base station 610 receiving and accurately decoding the PUSCH communication is enhanced, which positively affects network performance.

As indicated above, FIG. 6 is provided as an example. Other examples may differ from what is described with regard to FIG. 6.

Figure 7:
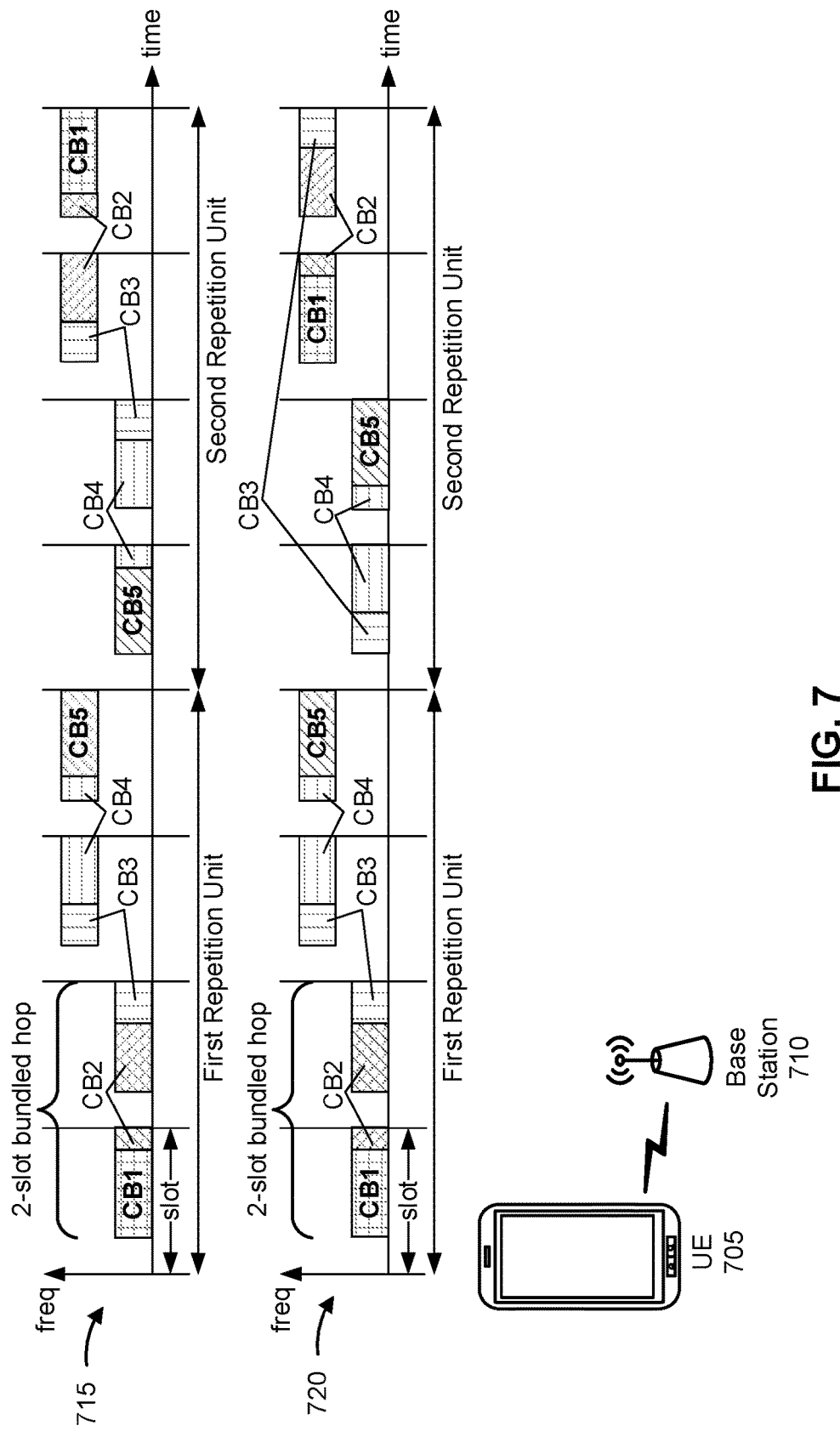

FIG. 7 is a diagram illustrating an example 700 associated with code block operation for PUSCH repetition with transport block scaling and frequency hopping, in accordance with various aspects of the present disclosure. As shown in FIG. 7, a UE 705 (e.g., similar to the UE 605 shown in FIG. 6) and a base station 710 (e.g., similar to the base station 610 shown in FIG. 6) may communicate with one another. The UE 705 and the base station 710 may communicate with one another via a wireless network (e.g., the wireless network 100 shown in FIG. 1). The UE 705 may be, or be similar to, the UE 120 shown in FIG. 1, and the base station 710 may be, or be similar to, the base station 110 shown in FIG. 1.

In some aspects, the UE 705 may transmit PUSCH repetitions to the base station 710 based at least in part on a code block mapping order. As shown by reference number 715, for example, the at least one code block mapping order may include a first code block mapping corresponding to a first repetition unit of the at least one repetition unit and a second code block mapping corresponding to a second repetition unit of the at least one repetition unit, where the first code block mapping includes a first code block shuffle, and the second code block mapping includes a second code block shuffle. For example, as shown by reference number 715, in the first repetition unit, CB1, CB2, and a portion of CB3 are transmitted using a first frequency resource. In the second repetition unit, the code blocks are shuffled so that CB5, CB4, and a portion of CB3 are transmitted using the first frequency resource. Similarly, during the first repetition unit, CB4, CB5, and a portion of CB3 are transmitted using a second frequency resource. During the second repetition unit, CB1, CB2, and a portion of CB3 are transmitted using the second frequency resource As shown by reference number 720, a first code block mapping corresponding to the first repetition unit may include a first frequency hop mapping order associated with a first frequency resource and a second frequency resource. As shown, for example, in the first repetition unit, CB1, CB2, and first portion of CB3 are transmitted first using the first frequency resource, and CB4, CB5, and a second portion of CB3 are transmitted next using the second frequency resource. The second code block mapping corresponding to the second repetition unit may include a second frequency hop mapping order associated with the first frequency resource and the second frequency resource. In the second repetition unit, as shown, the first frequency hop mapping order is reversed with respect to the frequency hop mapping order of the first repetition unit. For example, as shown, in the second repetition unit, CB4, CB5, and the second portion of CB3 are transmitted first using the first frequency resource, and CB1, CB2 and the first portion of CB3 are transmitted next using the second frequency.

For example, the order of the code blocks containing the encoded bits may be CB1, CB2, CB3, CB4, and CB5. However, for preparing PUSCH communications, a fetch order associated with fetching the encoded bits sequentially for preparation for PUSCH communications for different slots may be different between the first repetition unit and the second repetition unit. For example, the fetch order for the first repetition unit may be slot 1 (corresponding to the first frequency resource), slot 2 (corresponding to the first frequency resource), slot 3 (corresponding to the second frequency resource), and slot 4 (corresponding to the second frequency resource), as shown. The fetch order for the second repetition unit may be, for example, slot 7 (corresponding to the second frequency resource), slot 8 (corresponding to the second frequency resource), slot 5 (corresponding to the first frequency resource), and slot 6 (corresponding to the first frequency resource).

As with shifting and/or interleaving encoded bits, the illustrated shuffling and mapping of code blocks into different orders are techniques that may be used to provide frequency diversity with respect to the code blocks.

As indicated above, FIG. 7 is provided as an example. Other examples may differ from what is described with regard to FIG. 7.

FIG. 8 is a diagram illustrating an example process 800 performed, for example, by a UE, in accordance with various aspects of the present disclosure. Example process 800 is an example where the UE (e.g., UE 120) performs operations associated with code block operation for PUSCH repetitions with transport block scaling and frequency hopping.

As shown in FIG. 8, in some aspects, process 800 may include determining a transport block size based at least in part on a set of physical uplink shared channel resources corresponding to a set of physical uplink shared channel repetitions that are indicated to be transmitted over at least one repetition unit in accordance with a frequency hopping pattern and at least one code block mapping order corresponding to the at least one repetition unit (block 810). For example, the UE (e.g., using communication manager 1004, depicted in FIG. 10) may determine a transport block size based at least in part on a set of physical uplink shared channel resources corresponding to a set of physical uplink shared channel repetitions that are indicated to be transmitted over at least one repetition unit in accordance with a frequency hopping pattern and at least one code block mapping order corresponding to the at least one repetition unit, as described above.

As further shown in FIG. 8, in some aspects, process 800 may include transmitting the set of physical uplink shared channel repetitions based at least in part on the transport block size (block 820). For example, the UE (e.g., using transmission component 1006, depicted in FIG. 10) may transmit the set of physical uplink shared channel repetitions based at least in part on the transport block size, as described above.

Process 800 may include additional aspects, such as any single aspect or any combination of aspects described below and/or in connection with one or more other processes described elsewhere herein.

With respect to process 800, in some aspects, the frequency hopping pattern comprises a single-slot hop.

With respect to process 800, in some aspects, the frequency hopping pattern comprises a bundled multi-slot hop.

With respect to process 800, in some aspects, the at least one code block mapping order includes a first code block mapping corresponding to a first repetition unit of the at least one repetition unit and a second code block mapping corresponding to a second repetition unit of the at least one repetition unit.

With respect to process 800, in some aspects, a first code block mapping order of the first code block mapping corresponding to the first repetition unit is different than a second code block mapping order of the second code block mapping corresponding to the second repetition unit.

With respect to process 800, in some aspects, the first code block mapping comprises a first cyclic shift of a plurality of encoded bits, and wherein the second code block mapping comprises a second cyclic shift of the plurality of encoded bits that is different than the first cyclic shift.

With respect to process 800, in some aspects, a shift value corresponding to the first cyclic shift is equal to an encoded bit length of one or more code blocks associated with the first repetition unit.

With respect to process 800, in some aspects, the first code block mapping comprises a first cross-code block interleaving of encoded bits, and wherein the second code block mapping comprises a second cross-code block interleaving of the encoded bits.

With respect to process 800, in some aspects, the first code block mapping comprises a first code block shuffle, and wherein the second code block mapping comprises a second code block shuffle.

With respect to process 800, in some aspects, the first code block mapping comprises a first order of code blocks associated with a first frequency resource and a second order of the code blocks, different than the first order, associated with a second frequency resource, and wherein the second code block mapping comprises the second order of code blocks associated with the first frequency resource and the first order of the code blocks associated with the second frequency resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where the base station (e.g., base station 110) performs operations associated with code block operation for PUSCH repetitions with transport block scaling and frequency hopping.

As shown in FIG. 9, in some aspects, process 900 may include transmitting a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit in accordance with a frequency hopping pattern and at least one code block mapping order corresponding to the at least one repetition unit (block 910). For example, the base station (e.g., using transmission component 1106, depicted in FIG. 11) may transmit a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit in accordance with a frequency hopping pattern and at least one code block mapping order corresponding to the at least one repetition unit, as described above.

As further shown in FIG. 9, in some aspects, process 900 may include receiving the set of physical uplink shared channel repetitions based at least in part on the transport block size (block 920). For example, the base station (e.g., using reception component 1102, depicted in FIG. 11) may receive the set of physical uplink shared channel repetitions based at least in part on the transport block size, as described above.

Process 900 may include additional aspects, such as any single aspect or any combination of aspects described below and/or in connection with one or more other processes described elsewhere herein.

With respect to process 900, in some aspects, the frequency hopping pattern comprises a single-slot hop.

With respect to process 900, in some aspects, the frequency hopping pattern comprises a bundled multi-slot hop.

With respect to process 900, in some aspects, the at least one code block mapping order includes a first code block mapping corresponding to a first repetition unit of the at least one repetition unit and a second code block mapping corresponding to a second repetition unit of the at least one repetition unit.

With respect to process 900, in some aspects, a first code block mapping order of the first code block mapping corresponding to the first repetition unit is different than a second code block mapping order of the second code block mapping corresponding to the second repetition unit.

With respect to process 900, in some aspects, the first code block mapping comprises a first cyclic shift of a plurality of encoded bits, and wherein the second code block mapping comprises a second cyclic shift of the plurality of encoded bits that is different than the first cyclic shift.

With respect to process 900, in some aspects, a shift value corresponding to the first cyclic shift is equal to an encoded bit length of one or more code blocks associated with the first repetition unit.

With respect to process 900, in some aspects, the first code block mapping comprises a first cross-code block interleaving of encoded bits, and wherein the second code block mapping comprises a second cross-code block interleaving of the encoded bits.

With respect to process 900, in some aspects, the first code block mapping comprises a first code block shuffle, and wherein the second code block mapping comprises a second code block shuffle.

With respect to process 900, in some aspects, the first code block mapping comprises a first order of code blocks associated with a first frequency resource and a second order of the code blocks, different than the first order, associated with a second frequency resource, and wherein the second code block mapping comprises the second order of code blocks associated with the first frequency resource and the first order of the code blocks associated with the second frequency resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
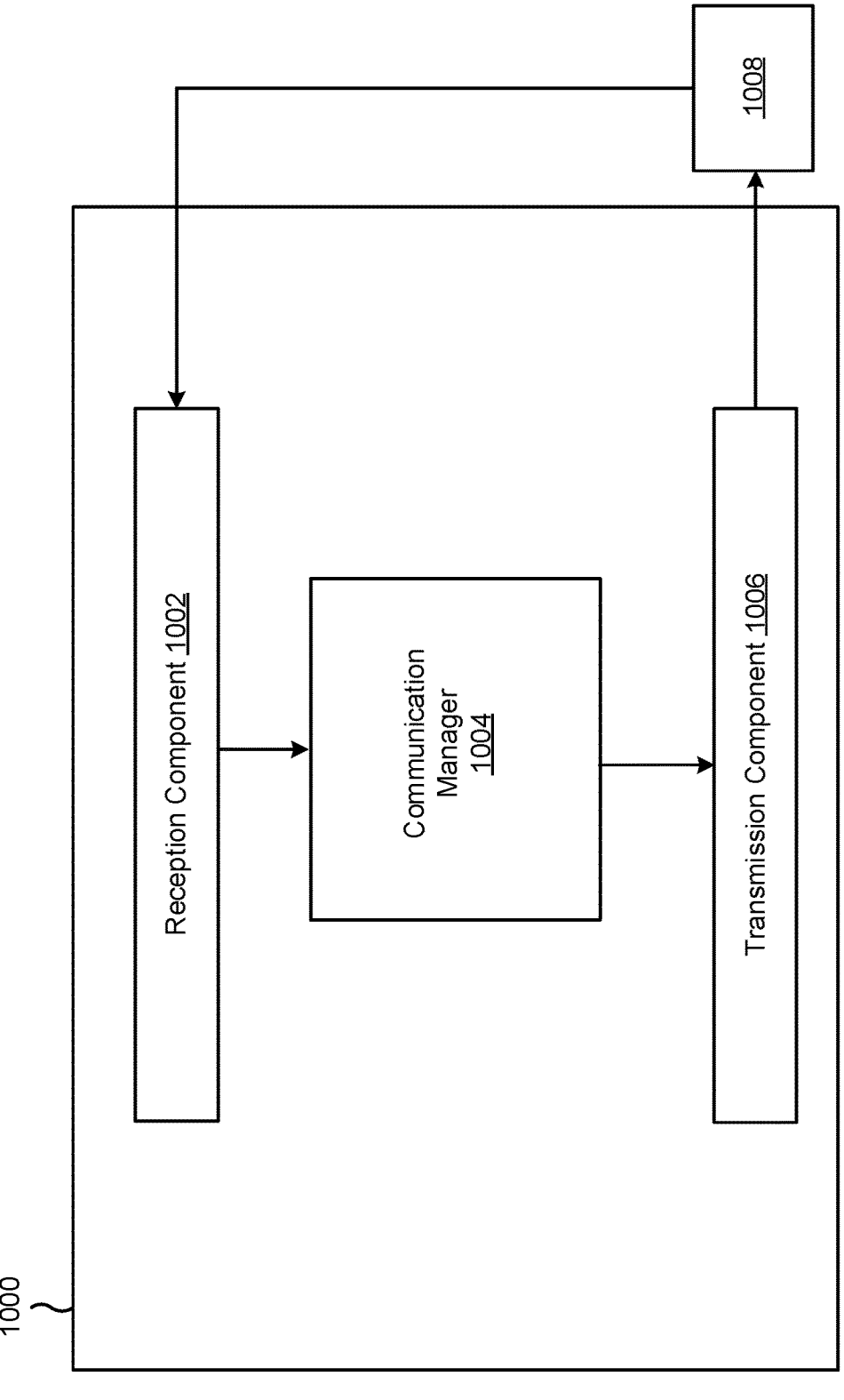
FIGS. 10 and 11 are diagrams illustrating example apparatuses for wireless communication, in accordance with various aspects of the present disclosure.

FIG. 10 is a block diagram of an example apparatus 1000 for wireless communication in accordance with various aspects of the present disclosure. The apparatus 1000 may be, be similar to, include, or be included in a UE (e.g., UE 705 shown in FIG. 7, UE 605 shown in FIG. 6). In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a client, a server, a UE, a base station, or another wireless communication device) using the reception component 1002 and the transmission component 1006.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 may include one or more components of the first UE described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the first UE described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the first UE described above in connection with FIG. 2. In some aspects, the transmission component 1006 may be co-located with the reception component 1002 in a transceiver.

In some aspects, the communication manager 1004 may provide means for determining a transport block size based at least in part on a set of physical uplink shared channel resources corresponding to a set of physical uplink shared channel repetitions that are indicated to be transmitted over at least one repetition unit in accordance with a frequency hopping pattern and at least one code block mapping order corresponding to the at least one repetition unit; and transmitting the set of physical uplink shared channel repetitions based at least in part on the transport block size. In some aspects, the communication manager 1004 may include a controller/processor, a memory, or a combination thereof, of the first UE described above in connection with FIG. 2. In some aspects, the communication manager 1004 may include the reception component 1002, the transmission component 1006, and/or the like. In some aspects, the means provided by the communication manager 1004 may include, or be included within, means provided by the reception component 1002, the transmission component 1004, and/or the like.

In some aspects, the communication manager 1004 and/or one or more components of the communication manager 1004 may include or may be implemented within hardware. In some aspects, the communication manager 1004 and/or one or more components thereof may include or may be implemented within a controller/processor, a memory, or a combination thereof, of the UE 120 described above in connection with FIG. 2.

In some aspects, the communication manager 1004 and/or one or more components of the communication manager 1004 may be implemented in code (e.g., as software or firmware stored in a memory). For example, the communication manager 1004 and/or a component (or a portion of a component) of the communication manager 1004 may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a controller/processor, a memory, a scheduler, a communication unit, or a combination thereof, of the UE 120 described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
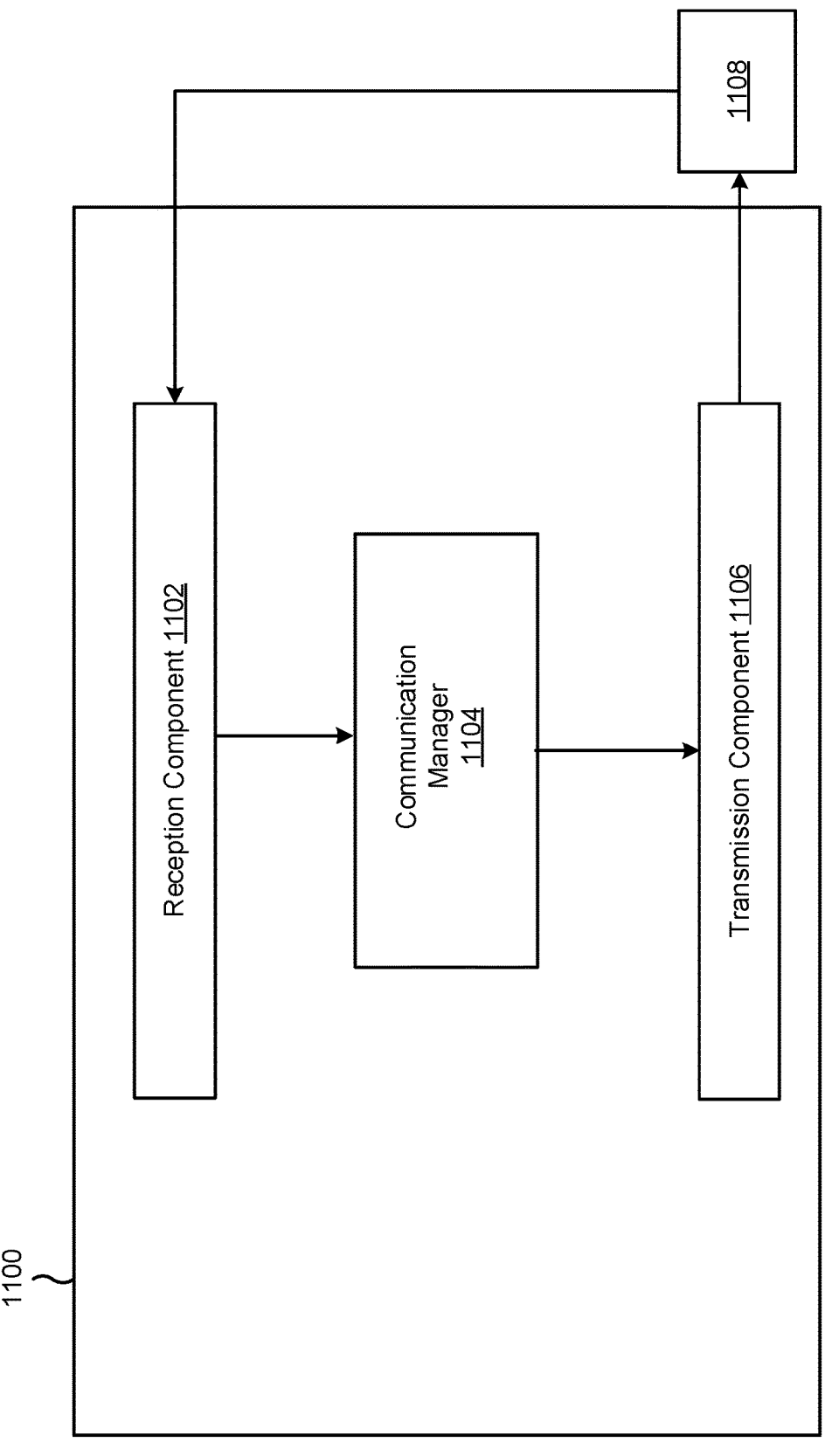

FIG. 11 is a block diagram of an example apparatus 1100 for wireless communication in accordance with various aspects of the present disclosure. The apparatus 1100 may be, be similar to, include, or be included in a base station (e.g., base station 710 shown in FIG. 7, base station 610 shown in FIG. 6). In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a client, a server, a UE, a base station, or another wireless communication device) using the reception component 1102 and the transmission component 1106.

In some aspects, the apparatus 1100 may be configured to perform one or more operations described herein in connection with FIG. 6-7. Additionally, or alternatively, the apparatus 1000 may be configured to perform one or more processes described herein, such as process 900 of FIG. 9. In some aspects, the apparatus 1100 may include one or more components of the base station described above in connection with FIG. 2.

The reception component 1102 may provide means for receiving communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may provide means for transmitting communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may provide means for performing signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

The communication manager 1104 may provide means for transmitting a physical uplink shared channel repetition configuration comprising an indication to determine a transport block size based at least in part on a set of physical uplink shared channel resources corresponding to a set of physical uplink shared channel repetitions that are configured to be transmitted over at least one repetition unit in accordance with a frequency hopping pattern and at least one code block mapping order corresponding to the at least one repetition unit; and receiving the set of physical uplink shared channel repetitions based at least in part on the transport block size. In some aspects, the communication manager 1104 may include a controller/processor, a memory, a scheduler, a communication unit, or a combination thereof, of the base station described above in connection with FIG. 2. In some aspects, the communication manager 1104 may include the reception component 1102, the transmission component 1106, and/or the like. In some aspects, the means provided by the communication manager 1104 may include, or be included within means provided by the reception component 1102, the transmission component 1104, and/or the like.

In some aspects, the communication manager 1104 and/or one or more components thereof may include or may be implemented within hardware. In some aspects, the communication manager 1104 and/or one or more components thereof may include or may be implemented within a controller/processor, a memory, or a combination thereof, of the BS 110 described above in connection with FIG. 2.

In some aspects, the communication manager 1104 and/or one or more components thereof may be implemented in code (e.g., as software or firmware stored in a memory). For example, the communication manager 1104 and/or a component (or a portion of a component) of the communication manager 1104 may be implemented as instructions or code stored in a non-transitory computer-readable medium and executable by a controller or a processor to perform the functions or operations of the communication manager 1104 and/or the component. If implemented in code, the functions of the communication manager 1104 and/or a component may be executed by a controller/processor, a memory, a scheduler, a communication unit, or a combination thereof, of the BS 110 described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment for wireless communication, comprising:

a memory; and one or more processors coupled to the memory, the one or more processors configured to:

determine a transport block size based at least in part on a set of physical uplink shared channel resources corresponding to a set of physical uplink shared channel repetitions that are indicated to be transmitted over a set of repetition units in accordance with a frequency hopping pattern and at least one code block mapping order corresponding to the set of repetition units, wherein:

each repetition unit, of the set of repetition units, includes a respective plurality of slots in accordance with the frequency hopping pattern; and the at least one code block mapping order includes a first code block mapping corresponding to a first repetition unit of the set of repetition units and a second code block mapping corresponding to a second repetition unit of the set of repetition units; and transmit the set of physical uplink shared channel repetitions based at least in part on the transport block size.

2. The user equipment of claim 1, wherein the frequency hopping pattern comprises a single-slot hop.

3. The user equipment of claim 1, wherein the frequency hopping pattern comprises a bundled multi-slot hop.

4. The user equipment of claim 1, wherein a first code block mapping order of the first code block mapping corresponding to the first repetition unit is different than a second code block mapping order of the second code block mapping corresponding to the second repetition unit.

5. The user equipment of claim 4, wherein the first code block mapping comprises a first cyclic shift of a plurality of encoded bits, and wherein the second code block mapping comprises a second cyclic shift of the plurality of encoded bits that is different than the first cyclic shift.

6. The user equipment of claim 5, wherein a shift value corresponding to the first cyclic shift is equal to an encoded bit length of one or more code blocks associated with the first repetition unit.

7. The user equipment of claim 4, wherein the first code block mapping comprises a first cross-code block interleaving of encoded bits, and wherein the second code block mapping comprises a second cross-code block interleaving of the encoded bits.

8. The user equipment of claim 1, wherein the first code block mapping comprises a first code block shuffle, and wherein the second code block mapping comprises a second code block shuffle.

9. The user equipment of claim 1, wherein the first code block mapping comprises a first frequency hop mapping order associated with a first frequency resource and a second frequency resource, and wherein the second code block mapping comprises a second frequency hop mapping order associated with the first frequency resource and the second frequency resource.

10. The user equipment of claim 1, wherein the one or more processors are configured to:

receive a physical uplink shared channel repetition configuration that includes an indication to determine the transport block size.

11. A base station for wireless communication, comprising:

a memory; and one or more processors coupled to the memory, the one or more processors configured to:

transmit a physical uplink shared channel repetition configuration comprising an indication to determine a transport block size based at least in part on a set of physical uplink shared channel resources corresponding to a set of physical uplink shared channel repetitions that are configured to be transmitted over a set of repetition units in accordance with a frequency hopping pattern and at least one code block mapping order corresponding to the set of repetition units, wherein:

each repetition unit, of the set of repetition units, includes a respective plurality of slots in accordance with the frequency hopping pattern; and the at least one code block mapping order includes a first code block mapping corresponding to a first repetition unit of the set of repetition units and a second code block mapping corresponding to a second repetition unit of the set of repetition units; and receive the set of physical uplink shared channel repetitions based at least in part on the transport block size.

12. The base station of claim 11, wherein the frequency hopping pattern comprises a single-slot hop.

13. The base station of claim 11, wherein the frequency hopping pattern comprises a bundled multi-slot hop.

14. The base station of claim 11, wherein a first code block mapping order of the first code block mapping corresponding to the first repetition unit is different than a second code block mapping order of the second code block mapping corresponding to the second repetition unit.

15. The base station of claim 14, wherein the first code block mapping comprises a first cyclic shift of a plurality of encoded bits, and wherein the second code block mapping comprises a second cyclic shift of the plurality of encoded bits that is different than the first cyclic shift.

16. The base station of claim 15, wherein a shift value corresponding to the first cyclic shift is equal to an encoded bit length of one or more code blocks associated with the first repetition unit.

17. The base station of claim 14, wherein the first code block mapping comprises a first cross-code block interleaving of encoded bits, and wherein the second code block mapping comprises a second cross-code block interleaving of the encoded bits.

18. The base station of claim 11, wherein the first code block mapping comprises a first code block shuffle, and wherein the second code block mapping comprises a second code block shuffle.

19. The base station of claim 11, wherein the first code block mapping comprises a first order of code blocks associated with a first frequency resource and a second order of the code blocks, different than the first order, associated with a second frequency resource, and wherein the second code block mapping comprises the second order of the code blocks associated with the first frequency resource and the first order of the code blocks associated with the second frequency resource.

20. The base station of claim 11, wherein the one or more processors are configured to:

transmit a physical uplink shared channel repetition configuration that includes an indication to determine the transport block size.

21. A method of wireless communication performed by a user equipment, comprising:

determining a transport block size based at least in part on a set of physical uplink shared channel resources corresponding to a set of physical uplink shared channel repetitions that are indicated to be transmitted over a set of repetition units in accordance with a frequency hopping pattern and at least one code block mapping order corresponding to the set of repetition units, wherein;

each repetition unit, of the set of repetition units, includes a respective plurality of slots in accordance with the frequency hopping pattern; and the at least one code block mapping order includes a first code block mapping corresponding to a first repetition unit of the set of repetition units and a second code block mapping corresponding to a second repetition unit of the set of repetition units; and transmitting the set of physical uplink shared channel repetitions based at least in part on the transport block size.

22. The method of claim 21, wherein the frequency hopping pattern comprises a single-slot hop.

23. The method of claim 21, wherein the frequency hopping pattern comprises a bundled multi-slot hop.

24. The method of claim 21, wherein a first code block mapping order of the first code block mapping corresponding to the first repetition unit is different than a second code block mapping order of the second code block mapping corresponding to the second repetition unit.

25. The method of claim 24, wherein the first code block mapping comprises a first cyclic shift of a plurality of encoded bits, and wherein the second code block mapping comprises a second cyclic shift of the plurality of encoded bits that is different than the first cyclic shift.

26. The method of claim 25, wherein a shift value corresponding to the first cyclic shift is equal to an encoded bit length of one or more code blocks associated with the first repetition unit.

27. The method of claim 24, wherein the first code block mapping comprises a first cross-code block interleaving of encoded bits, and wherein the second code block mapping comprises a second cross-code block interleaving of the encoded bits.

28. The method of claim 21, wherein the first code block mapping comprises a first code block shuffle, and wherein the second code block mapping comprises a second code block shuffle.

29. The method of claim 21, wherein the first code block mapping comprises a first order of code blocks associated with a first frequency resource and a second order of the code blocks, different than the first order, associated with a second frequency resource, and wherein the second code block mapping comprises the second order of the code blocks associated with the first frequency resource and the first order of the code blocks associated with the second frequency resource.

30. The method of claim 21, further comprising:

receiving a physical uplink shared channel repetition configuration that includes an indication to determine the transport block size.

\* \* \* \* \*